United States Patent Office 3,845,055
Patented Oct. 29, 1974

3,845,055
2,4-DIAMINOPYRIMIDINE-5-CARBOXYLIC
ACID AMIDES
Karl Hoegerle, Basel, Christian Vogel, Binningen, Peter Boehler, Aesch, and Hans Ackermann, Bottmingen, Switzerland, assignors to Ciba-Geigy Corporation, Ardsley, N.Y.
No Drawing. Filed May 8, 1972, Ser. No. 251,411
Claims priority, application Switzerland, May 12, 1971, 6,969/71
Int. Cl. C07d 51/42
U.S. Cl. 260—256.4 N       9 Claims

ABSTRACT OF THE DISCLOSURE 2,4-diaminopyrimidine-5-carboxylic acid amides, such as 2-isopropylamino - 4 - methylaminopyrimidine-5-carboxylic acid methylamide, processes selective herbicidal properties and are suitable as post-emergence or pre-emergence herbicides for the control of gramineous and dicotyledonous weeds in various cultivated crops.

---

The present invention relates to herbicidally active 2,4-diaminopyrimidine-5-carboxylic acid amides, to processes for their production, as well as to herbicidal agents containing as active substances such pyrimidine derivatives, also to processes for the control of gramineous and dicotyle donous weeds by application of the said active substances or of agents containing them.

The stated 2,4-diaminopyrimidine - 5 - carboxylic acid amides correspond to formula I:

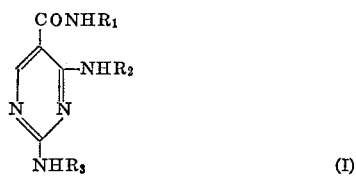

(I)

and include also possible salts with inorganic or organic acids.

The symbols in this formula have the following meanings:

$R_1$ represents a lower alkyl radical or the cyclopropyl radical, $R_2$ and $R_3$ each independently represent an alkyl radical optionally substituted by alkoxy or cycloalkyl, an alkenyl radical, an alkynyl radical or a cycloakyl radical.

By alkyl radicals are meant in formula I straight-chain or branched radicals having 1 to 3 carbon atoms with respect to the radical denoted by $R_1$, and 1 to 8 carbon atoms with respect to the radicals denoted by $R_2$ and $R_3$, such as, e.g. methyl, ethyl, n-propyl, isopropyl, n-butyl, isobutyl, sec-butyl, tert-butyl, n-pentyl, n-hexyl, n-heptyl, n-octyl, and the isomers of the $C_5$–$C_8$-alkyl radicals. It is, in particular, the lower straight-chain and branched alkyl radicals, i.e. those having 1 to 3 carbon atoms, which form the alkyl moiety of alkoxyalkyl radicals $R_2$ and $R_3$. Alkenyl radicals in formula I are straight-chain or branched radicals having 3 to 8 carbon atoms; the allyl and methallyl radical are preferred. Alkynyl radicals $R_2$ and $R_3$ preferably contain 3 to 5 carbon atoms; propynyl and butynyl radicals are preferred, such as the 2-propynyl radical, or a propinyl radical substituted by lower alkyl. To be mentioned as cycloaliphatic radicals denoted by $R_2$ and $R_3$ are cycloalkyl radicals having 3 to 6 carbon atoms, such as the cyclopropyl, cyclobutyl, cyclopentyl or cyclohexyl radical. These cycloalkyl radicals can moreover be substituted by lower alkyl radicals, preferably by methyl, ethyl, n-propyl and isopropyl.

Suitable salt formers for the pyrimidine derivatives of formula I are, in the first place, mineral acids such as hydrochloric acid, hydrobromic acid, hydroidoic acid, sulphuric acid, phosphoric acid, perchloric acid, chloric acid or nitric acid; but also organic acids such as acetic acid, mono-, di-, and trichloroacetic acid, methanesulphonic acid, p-toluenesulphonic acid, and others.

The new 2,4-diaminopyrimidine - 5 - carboxylic acid amides of formula I are produced according to the present invention by the exchange in a dihalogenpyrimidinecarboxylic acid halide of formula II:

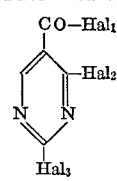

(II)

wherein $Hal_1$, $Hal_2$ and $Hal_3$ represent halogen atoms, preferably chlorine, of the three halogen atoms, in the sequence $Hal_1$, $Hal_2$, $Hal_3$, respectively, in the present of an acid-binding agent, for the radicals of the amines of formulae IIIa–c:

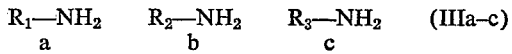

and, optionally, the conversion of the obtained final products, with the aid of an acid or of a functional acid derivative (e.g. acid chloride, acid anhydride), into a corresponding salt.

$R_1$, $R_2$ and $R_3$ in formulae IIIa–c have the meanings given under formula I.

The reactions are performed in solvents or diluents which are inert to the reactants; the following are suitable for this purpose: aliphatic, aromatic or halogenated hydrocarbons such as benzene, toluene, xylenes, chlorobenzene, chloroform, methylene chloride, ethylene chloride; ethers and ethereal compounds such as dialkyl ether, dioxane, tetrahydrofuran; alkanols such as methanol, ethanol, propanol; ketones such as acetone, methyl ethyl ketone; nitriles such as acetonitrile; N,N-dialkylated amides such as dimethylformamide; dimethylsulphoxide, as well as water. Mixtures of the mentioned solvents with water are preferred, whereby both one-phase and two-phase systems can be used for the reactions.

Suitable acid-binding agents for the process according to the invention are organic or inorganic bases, e.g. tertiary amines such as trialkylamines, dialkylanilines, pyridine and pyridine bases, as well as hydroxides, hydrogen carbonates, and carbonates of alkali metals and alkaline-earth metals. Furthermore, it is possible to use the amines of formulae IIIa–c in excess as acid-binding agents.

The production of the pyrimidinecarboxylic acid amides of formula I wherein $R_1$, $R_2$ and $R_3$ have different meanings requires a step-by-step reaction procedure, and an isolation of the intermediates. The reaction temperatures for the exchange of the first halogen atom are between −50° and 10° C., preferably between −10° and 0°; for the exchange of the second halogen atom between 0° and 70°, preferably between 30° and 50°; and for the exchange of the third halogen atom between 40° and 150° C., preferably between 80° and 100°. The corresponding amines of formulae IIIa–c are in each case used in equimolecular amounts in the reaction, or in double-molecular amounts if the amine is simultaneously serving as an acid-binding agent. If two or all three radicals $R_1$ to $R_3$ have the same meaning, then it is not necessary to isolate all intermediates. The reaction can then be carried out in two stages, or in one stage, with employment of the corresponding molecular amounts of the amines of formulae IIIa–c. The starting materials of formula II are known.

The obtainment of corresponding salts of the pyrimidine derivatives of formula I is effected by the usual methods: by the addition of the corresponding fairly concentrated acid to the free bases, e.g. in a solvent in which the salt is difficultly soluble or insoluble. Chlorides can also be obtained by introduction of hydrogen chloride gas into the amine or into an anhydrous amine solution. Perchlorates are obtainable by addition of the free base in aqueous solution of, e.g. 50–70% perchloric acid, with slight heating and subsequent cooling of the clear solution.

By virtue of their herbicidal properties, compounds of formula IV

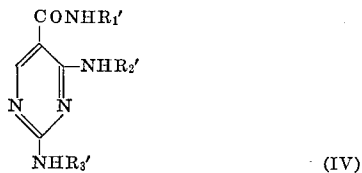

(IV)

are preferred. The symbols in this formula have the following meanings:

$R_1'$ and $R_2'$ each independently represent methyl or ethyl, $R_3'$ represents α-branched alkyl, alkenyl and alkynyl, or cycloalkyl.

By alkyl radicals $R_3'$ are meant, in particular, branched alkyl radicals having 3 to 8 carbon atoms, such as the isopropyl, sec-butyl, tert-butyl, sec-pentyl radical, etc. Cycloalkyl radicals $R_3'$ contain 3 to 6 carbon atoms; the cyclohexyl radical is preferred. These radicals can be substituted by lower alkyl radicals such as, e.g. the methyl or ethyl radical.

The following examples illustrate the production of the new 2,4-diaminopyrimidine-5-carboxylic acid amides of formula I. Further compounds of formula I were produced by the processes described in the examples, these compounds being listed in the included table. The temperatures are expressed in degrees Centigrade.

EXAMPLE 1

(a) An amount of 420 g. of 2,4-dichloropyrimidine-5-carboxylic acid chloride dissolved in 350 g. of methyl ethyl ketone is added dropwise at 0° to —5° to a mixture of 800 g. of aqueous 35% methylamine solution and 3 litres of water. The reaction mixture is afterwards heated to 55°; it is maintained at this temperature for one hour, and then cooled to 5°. The formed precipitate is filtered off and recrystallised from methanol/water. 2-Chloro-4-methylaminopyrimidine-5-carboxylic acid methylamide, M.P. 210°–212°, is obtained.

(b) 10 g. of 2-chloro-4-methylaminopyrimidine-5-carboxylic acid methylamide, 30 ml. of 70% aqueous isopropylamine solution, and 100 ml. of ethanol are refluxed for 15 hours. The solution is then concentrated by evaporation, the oily residue taken up in methanol, and precipitated by the addition of water. After recrystallisation from benzene, 2 - isopropylamino-4-methylaminopyrimidine-5-carboxylic acid methylamide, M.P. 170°, is obtained.

EXAMPLE 2

An amount of 10 g. of 2-chloro-4-methylaminopyrimidine-5-carboxylic acid methylamide in 15 g. of tert-butylamine and 100 ml. of ethanol is held for 24 hours in an autoclave at 120°. After cooling, the solution is concentrated by evaporation, and the residue recrystallised from methanol/water. The obtained 2-tert-butylamino-4-methylaminopyrimidine-5-carboxylic acid methylamide has the melting point 156–158°.

EXAMPLE 3

(a) An amount of 630 g. of 2,4-dichloropyrimidine-5-carboxylic acid chloride is dissolved in 3 litres of methylene chloride; the solution is cooled to —15° and an addition is made dropwise at this temperature of 550 g. of aqueous 51.3% ethylamine solution. Stirring is continued without cooling until the suspension has attained room temperature, and filtration then performed. The filtrate is extracted with 1 litre of water; the residue is combined with the filtered off crystals, and 3 litres of methylene chloride are added. The extract is dried over sodium sulphate and concentrated by evaporation; the residue is suspended in diethyl ether/petroleum ether 1:1, and filtration carried out. The obtained 2,4-dichloropyrimidine-5-carboxylic acid ethyl amide melts at 137°.

(b) An amount of 120 g. of aqueous 41% methylamine solution is added dropwise to a solution of 160 g. of 2,4-dichloropyrimidine-5-carboxylic acid ethylamide in 1 litre of acetonitrile. The temperature is kept below 50°. Stirring is continued for a further half hour at this temperature, and the reaction solution then concentrated by evaporation. The residue is suspended in ice water, filtered off and dried in vacuum. After recrystallisation from acetonitrile, 2-chloro-4-methylaminopyrimidine-5-carboxylic acid ethylamide, M.P. 192°–193°, is obtained.

(c) An amount of 45 g. of 2-chloro-4-methylaminopyrimidine-5-carboxylic acid ethylamide, 30 g. of isopropylamine, 200 ml. of ethanol and 50 ml. of water is refluxed for 15 hours. The solution is subsequently concentrated by evaporation, and the residue recrystallised from methanol/water. The obtained 2-isopropylamino-4-methylaminopyrimidine-5-carboxylic acid ethylamide has the melting point 175°–177°.

EXAMPLE 4

An amount of 100 g. of 2,4-dichloropyrimidine-5-carboxylic acid methylamide is added to a mixture of 200 g. of aqueous 51% ethylamine solution, 200 g. of ice and 10 ml. of acetonitrile, and the whole slowly heated to the boiling point. The reaction mixture is afterwards maintained at 15°; it is cooled after the addition of 40 g. of sodium chloride, and the precipitate filtered off. After recrystallisation from acetonitrile, 2,4-bis-ethylaminopyrimidine-5-carboxylic acid methylamide, M.P. 171°, is obtained.

EXAMPLE 5

An amount of 70 g. of 2,4-dichloropyrimidine-5-carboxylic acid chloride dissolved in 100 ml. of acetonitrile is added dropwise to a mixture of 200 g. of 51% aqueous ethylamine solution, 200 g. of ice and 100 ml. of acetonitrile. The mixture is then refluxed for one hour. An amount of 50 g. of sodium chloride is subsequently dissolved in the reaction mixture and the whole cooled to 10°. The obtained precipitate is filtered off, and recrystallised from isopropanol/water to obtain 2,4-bis-ethylaminopyrimidine-5-carboxylic acid ethylamide, which melts at 145°–147°.

| Compound: | Melting point, degrees |
|---|---|
| 2 - ethylamino-4-methylaminopyrimidine-5-carboxylic acid methylamide | 191 |
| 2,4-bis-methylaminopyrimidine-5-carboxylic acid methylamide | 201 |
| 2 - methylamino-4-ethylaminopyrimidine-5-carboxylic acid methylamide | 199 |
| 2 - cyclopropylamino-4-ethylaminopyrimidine-5-carboxylic acid ethylamide | 148 |
| 2-cyclohexylamino - 4 - methylaminopyrimidine-5-carboxylic acid metyhlamide | 175 |
| 2-sec-butylamino - 4 - methylaminopyrimidine-5-carboxylic acid methylamide | 133 |
| 2-methylamino - 4 - ethylaminopyrimidine-5-carboxylic acid methylamide | 188 |
| 2-isopropylamino - 4 - ethylaminopyrimidine-5-carboxylic acid ethylamide | 151 |
| 2-cyclohexylamino - 4 - ethylaminopyrimidine-5-carboxylic acid ethylamide | 129 |

TABLE—Continued

| Compound: | Melting point, degrees |
|---|---|
| 2-sec-butylamino - 4 - ethylaminopyrimidine-5-carboxylic acid ethylamide | 129 |
| 2-sec-butylamino - 4 - ethylaminopyrimidine-5-carboxylic acid ethylamide | 147 |
| 2-tert-butylamino - 4 - ethylaminopyrimidine-5-carboxylic acid ethylamide | 125 |
| 2-methylamino - 4 - isopropylaminopyrimidine-5-carboxylic acid isopropylamide | 181 |
| 2-(1'-methyl - 2' - methoxyethylamino)-4-methylaminopyrimidine-5-carboxylic acid methylamide | 101 |
| 2-allylamino - 4 - methylaminopyrimidine-5-carboxylic acid methylamide | 151 |
| 2-[2',4'-dimethylpentyl - (3') - amino]-4-methylaminopyrimidine-5-carboxylic acid methylamide | 106 |
| 2-propargylamino - 4 - methylaminopyrimidine-5-carboxylic acid methylamide | 184 |
| 2 - isoproylamino-4-ethylaminopyrimidine-5-carboxylic acid methylamide | 148 |
| 2-[4' - methyl - pentyl - (2') - amino]-4-methylaminopyrimidine - 5 - carboxylic acid methylamide | 120 |
| 2-isopropylamino - 4 - ethylaminopyrimidine-5-carboxylic acid methylamide | 146–148 |
| 2-isopropylamino - 4 - ethylaminopyrimidine-5-carboxylic acid methylamide perchlorate | 124–127 |
| 2 - cyclopropylamino - 4 - methylaminopyrimidine-5-carboxylic acid methylamide | 176–178 |
| 2 - cyclopropylamino-4-ethylaminopyrimidine-5-carboxylic acid isoproylamide | 160–162 |
| 2-isopropylamino - 4 - isoproylaminopyrimidine-5-carboxylic acid isopropylamide | 176–178 |
| 2 - ($\alpha$ - cyclopropyl - ethylamino) - 4 - methylaminopyrimidine - 5 - carboxylic acid methylamide | 121–123 |

Particularly the following compounds are to be mentioned as herbicides:

Number: Compound
1 ____ 2 - cyclohexylamino-4-ethylaminopyrimidine-5-carboxylic acid ethylamide.
2 ____ 2-tert - butylamino-4-ethylaminopyrimidine-5-carboxylic acid ethylamide.
3 ____ 2 - isopropylamino - 4 - methylaminopyrimidine-5-carboxylic acid methylamide.
4 ____ 2 - cyclohexylamino - 4 - methylaminopyrimidine-5-carboxylic acid methylamide.
5 ____ 2 - sec - butylamino - 4 - methylaminopyrimidine-5-carboxylic acid methylamide.
6 ____ 2-tert - butylamino - 4 - methylaminopyrimidine-5-carboxylic acid methylamide.
7 ____ 2 - isopropylamino - 4 - methylaminopyrimidine-5-carboxylic acid ethylamide.
8 ____ 2-isopropylamino - 4 - ethylaminopyrimidine-carboxylic acid ethylamide.
9 ____ 2-sec-butylamino - 4 - ethylaminopyrimidine-5-carboxylic acid ethylamide.
10 ___ 2-ethylamino - 4 - methylaminopyrimidine-5-carboxylic acid methylamide.

EXAMPLE 6

1. Herbicidal action with application of the active substances before emergence of the plant (Pre-emergence application)

Immediately after the sowing of the test plants, the active substances are applied as an aqueous suspension, obtained from a 25% wettable powder, to the surface of the soil. The seed trays are then maintained at 22–25° with 50–70% relative humidity. The results of the test are evaluated after a period of 28 days.

The following are used as test plants:

Cultivated plants: Cotton (*Gossypium herbaccara*)
Weeds:
  Amaranthus docendens
  Chrysanthemum segetum
  Sinapis alba
  Ipomoea purpurea
  Alopecurus myosuorides
  Poa trivialis
  Lolium multiflorum
  Digitaria sanguinalis
  Setaria italica
  Echinochloa crus galli
  Galium aparine
  Vicia sativa
  Pastinaca sativa The respective amounts applied in this test are listed in the following table. Evaluation is on the basis of the following scale of values:

9=plants undamaged (control),
1=plants dead
2–8=intermediate stages of damage
—=not tested

| Active substance | Active substance concentration kg./hectare | Amaranthus docerdens | Chrysanthemum segetum | Sinapis alba | Ipomoea purpurea | Alopecurus myosuorides | Poa trivialis | Lolium multiflorum | Digitaria sanguinalis | Setaria italica | Echinochloa crus galli | Galium aparine | Vicia sativa | Pastinaca sativa |
|---|---|---|---|---|---|---|---|---|---|---|---|---|---|---|
| 3 | 2 | 1 | 1 | 1 | 1 | 2 | 1 | 1 | 1 | 1 | 1 | 2 | 1 | 1 |
|   | 1 | 1 | 1 | 2 | 1 | 2 | 1 | 2 | 1 | 1 | 1 | 2 | 2 | 1 |
| 4 | 2 | 1 | 1 | 1 | 1 | 1 | 1 | 2 | 1 | 1 | 1 | 2 | 3 | — |
|   | 1 | 1 | 1 | 1 | 2 | 1 | 1 | 2 | 1 | 1 | 1 | 3 | 3 | — |
| 5 | 2 | 1 | 1 | 1 | 1 | 1 | 1 | 1 | 1 | 1 | 1 | 2 | 2 | — |
|   | 1 | 1 | 1 | 1 | 1 | 2 | 1 | 2 | 1 | 1 | 1 | 2 | 3 | — |
|   | 0.5 | 1 | 1 | 1 | 1 | 2 | 1 | 3 | 2 | 2 | 2 | 2 | 3 | — |
| 7 | 2 | 1 | 1 | 1 | 1 | 1 | 1 | 2 | 1 | 1 | 2 | 2 | 4 | — |
|   | 1 | 1 | 1 | 1 | 1 | 1 | 1 | 2 | 1 | 1 | 2 | 2 | 4 | — |
|   | 0.5 | 1 | 1 | 1 | 1 | 2 | 1 | 2 | 2 | 3 | 2 | 3 | 4 | — |
| 9 | 2 | 1 | 1 | 2 | 1 | 2 | 1 | 3 | 2 | 3 | 3 | 3 | 3 | — |
|   | 1 | 1 | 1 | 2 | 1 | 2 | 1 | 3 | 3 | 3 | 3 | 4 | 5 | — |
| 6 | 2 | 1 | 1 | 1 | 1 | 1 | 1 | 2 | 2 | 2 | 3 | 2 | — | — |
|   | 1 | 1 | 1 | 1 | 1 | 1 | 1 | 3 | 2 | 2 | 3 | 3 | — | — |
|   | 0.5 | 1 | 1 | 3 | 1 | 2 | 1 | 3 | 2 | 2 | 4 | 3 | — | — |
| 8 | 2 | 1 | 1 | 2 | 1 | 2 | 1 | 3 | 2 | 2 | 2 | — | — | — |
|   | 1 | 1 | 1 | 3 | 2 | 3 | 1 | 4 | 3 | 3 | 4 | — | — | — |
| 2 | 2 | 1 | 2 | 2 | 3 | 2 | 2 | 3 | — | — | — | — | — | — |
| 1 | 2 | 1 | 3 | 3 | 2 | 3 | 1 | — | — | — | — | — | — | — |

HERBICIDAL ACTION ON COTTON

| Active substance | Active substance concentration in kg./hectare | | |
|---|---|---|---|
| | 8 | 4 | 2 |
| 3 | 8 | 9 | 9 |
| 4 | 7 | 7 | 7 |
| 5 | 8 | 8 | 8 |
| 6 | 7 | 7 | 8 |
| 7 | 7 | 7 | 8 |
| 8 | 7 | 7 | 7 |
| 9 | 8 | 8 | 8 |
| 1 | 7 | 7 | 7 |
| 2 | 8 | 8 | 8 |

Also in the case of soya beans and maize, the active substances exhibited only an insignificant herbicidal action or no herbicidal action at all.

2. Herbicidal action with application of the active substances after emergence of the plants (post-emergence application).

Sinapis alba, Lolium perenne, Poa trivialis, Setaria italica, Agrostis tenuis and Festuca rubra are sprayed in the 4- to 6-leaf stage with an aqueous active substance emulsion (obtained from a 25% emulsifiable concentrate), the concentration being 0.5 g. of active substance per square metre of sail (=5.0 kg. per hectare). The plants are then maintained at 24–26° with 45–60% relative humidity. The test is evaluated 14 days after the treatment. Evaluation is on the basis of the same scale of values:

9=plants undamaged (control),
1=plants dead,
8–2=intermediate stages of damage.

Composition of the emulsifiable concentrate:

25 parts of active substance; 32.5 parts of methyl ethyl ketone; 32.5 parts of 3,5,5-trimethyl-2-cyclohexen-1-one; and 10 parts of a mixture of nonylphenolpolyoxyethylene and calcium dodecylbenzenesulphonate.

| Active substance | Sinapis alba | Lolium perenne | Poa trivialis | Setaria italica | Agrostis tenuis | Festuca rubra |
|---|---|---|---|---|---|---|
| 3 | 1 | 2 | 1 | 1 | 1 | 2 |
| 5 | 1 | 1 | 2 | 1 | 2 | 3 |
| 6 | 1 | 1 | 1 | 1 | 1 | 2 |
| 7 | 1 | 2 | 1 | 1 | 1 | 1 |
| 9 | 1 | 1 | 2 | — | 1 | 3 |
| 10 | 1 | 3 | 3 | 2 | — | 3 |
| 4 | 1 | 3 | 2 | 2 | 2 | — |

The new pyrimidinecarboxylic acid amides of formula I possess excellent herbicidal properties, and are suitable as post-emergence or pre-emergence herbicides for the control of gramineous and dicotyledonous weeds in various cultivated crops, such as in corn, cotton, maize and rice crops. Furthermore, the active substances are very suitable, applied in the appropriate amounts, as defoliant and desiccant active substances for cotton crops.

Annual and perennial types of weeds which are deep-rooted and difficult to control, such as, e.g. millet varieties (Panicum sp.), mustard varieties (Sinapis sp.), goosefoot varieties (Chenopodiaceae), slender foxtail (Alopecurus sp.) and other pig weed varieties, e.g. Amaranthus sp., grasses, e.g. Lolium sp., compositae, e.g. Taraxacum sp., wild chamomile varieties (Matricaria sp.), are destroyed or inhibited in growth by the active substances of formula I, without damage being caused to useful plants such as corn, maize, rice, sorghum, soya beans, cotton, etc. Some of the pyrimidines embraced by formula I have moreover a good herbicidal action when applied as pre-emergence herbicides.

The applied amounts vary and are dependent on the time of application; they are between 0.1 and 10 kg. of active substance per hectare; in the case of application before emergence of the plants, the amount is up to 4 kg. per hectare, and after emergence of the plants the amount is 3 to 10 kg. of active substance per hectare. For the total destruction of the entire weed crop, e.g. on fallow land adjacent to the cultivated land, on railway embankments, on factory sites or on streets, it is however necessary to apply more than 10 kg. of active substance per hectare. The operation of the normal crop rotation is not impaired in consequence of application of the new active substances.

For application as a defoliant/desiccant, the amount normally applied is 0.1–2.5 kg. of active substance per hectare. The fruit crop is not harmed by the new active substances. Moreover, fruit not fully ripe, e.g. closed or partially opened cotton seed cases, or unripe legumes, can fully ripen without showing any signs of damage. The active substances can also be used for the defoliation of plant material destined for dispatch, e.g. in the case of the dispatch of ornamental plants and shrubs to tree nurseries.

Herbicidal agents according to the invention are produced in a manner known per se by the intimate mixing and grinding of active substances of the general formula I with suitable carriers, optionally with the addition of dispersing agents or solvents which are inert to the active substances. The active substances can be obtained and used in the following forms:

solid preparations: dusts, scattering agents, granulates, (coated granulates, impregnated granulates and homogeneous granulates);
water-dispersible concentrates of the active substance: wettable powders, pastes, emulsions;
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm.; for scattering agents from about 0.075 mm. to 0.2 mm.; and for granulates 0.2 mm. or coarser.

The concentrations of active substance in the solid preparation forms are from 0.5 to 80%.

To these mixtures may also be added additives stabilising the active substance, and/or non-ionic, anion-active, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/chalk mixture, cellulose derivatives (methyl cellulose, carboxymethyl cellulose), hydroxyethylene glycol ethers of monoalkyl and dialkyl phenols having 5 to 15 ethylene oxide radicals per molecule and 8 to 9 carbon atoms in the alkyl radical, liginsulphonic acid, its alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80%.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of liginsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, diertiary acetylene glycols, dialkyl diluaryl ammonium chloride, and fatty acid alkali-metal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm., and in the case of pastes not exceeding 0.03 mm. Dispersing agents such as those mentioned in the preceding paragraphs, organic solvents and water are used in the preparation of emulsion concentrates and pastes. Suitable solvents are, e.g. the following: alcohols, benzene, xylenes, toluene, dimethylsulphoxide, N,N-dialkylated amides, N-oxides of amines, especially trialkylamines, and mineral oil fractions boiling in the range of 120 to 350°. The solvents must be practically odourless, non-phytotoxic, inert to the active substances, and not readily inflammable.

Furthermore, the agents according to the invention can be used in the form of solutions. For this purpose the active substance (or several active substances) of the general formula I is (or are) dissolved in suitable organic solvents, mixtures of solvents, water, or mixtures of organic solvents with water. As organic solvents it is possible to use aliphatic and aromatic hydrocarbons, their chlorinated derivatives, alkylnaphthalenes, mineral oils on their own or in admixture with each other. The solutions should contain the active substances in a concentration of from 1 to 20%. These solutions can be applied either with the aid of a propellant gas (as a spray), or with special spraying devices (such as aerosol).

Other biocidal active substances may be added to the described agents according to the invention. For the widening of their sphere of action, the new agents may also contain, in addition to the stated compounds of the general formula I, e.g. insecticides, fungicides, bactericides, fungistatics, bacteriostatics or nematocides. The agents according to the invention can also contain fertilizers, trace elements, etc.

Preparations of the new active substances of the general formula I are described in the following. The term "parts" denotes parts by weight.

Wettable powder

The following constituents are used in the preparation of (a) a 25% and (b) a 10% wettable powder:

(a)

25 parts of 2-isopropylamino-4-methylaminopyrimidine-5-carboxylic acid methylamide,
5 parts of naphthalenesulphonic acid/phenolsulphonic acid/formaldehyde condensate 3:2:1,
5 parts of sodium dibutylnaphthyl sulphonate,
30 parts of Champagne chalk,
35 parts of kaolin;

(b)

10 parts of 2-tert-butylamino-4-methylaminopyrimidine-5-carboxylic acid methylamide,
0.6 part of sodium dibutylnaphthyl sulphonate,
1 part of naphthalenesulphonic acid/phenolsulphonic acid/formaldehyde condensate 3:2:1,
10 parts of sodium aluminum silicate,
78.4 parts of kaolin.

The stated active substance is absorbed on to the appropriate carriers (kaolin and chalk), and the whole subsequently mixed and ground with the other constituents. Wettable powders are thus obtained which possess excellent wetting and suspension properties. It is possible to prepare from such wettable powders, by dilution with water, suspensions having any desired concentration of active substance. These suspensions are applied for the control of grasses in cultivated crops.

Emulsion concentrate

The following constituents are mixed together for the preparation of a 25% emulsion concentrate:

25 parts of 2-sec-butylamino-4-methylaminopyrimidine-5-carboxylic acid methylamide,
10 parts of a mixture of nonylphenolpolyoxyethylene and calcium dodecylbenzenesulphone,
32.5 parts of methyl ethyl ketone,
32.5 parts of 3,5,5-trimethyl-2-cyclohexen-1-one.

This concentrate can be diluted with water to obtain such as, e.g. cotton, soya beans, maize, etc. are suitable for the control of grasses in cultivated crops such as, e.g. cotton, soya beans, maize, etc.

We claim:
1. 2-Isopropylamino - 4 - methylaminopyrimidine-5-carboxylic acid methylamide and its salts.
2. 2-tert.Butylamino - 4 - methylaminopyrimidine-5-carboxylic acid methylamide and its salts.
3. 2-Isopropylamino - 4 - methylaminopyrimidine-5-carboxylic acid ethylamide and its salts.
4. 2-Cyclohexylamino - 4 - methylaminopyrimidine-5-carboxylic acid methylamide and its salts.
5. 2-sec.Butylamino - 4 - methylaminopyrimidine-5-carboxylic acid methylamide and its salts.
6. 2-Isopropylamino - 4 - ethylaminopyrimidine-5-carboxylic acid ethylamide and its salts.
7. 2-sec.Butylamino - 4 - ethylaminopyrimidine-5-carboxylic acid ethylamide and its salts.
8. 2-Isopropylamino - 4 - ethylaminopyrimidine-5-carboxylic acid methylamide and its salts.
9. 2-Cyclopropylamino - 4 - methylaminopyrimidine-5-carboxylic acid methylamide and its salts.

References Cited

UNITED STATES PATENTS 2,844,578  7/1958  Acker _____ 260—256.5

OTHER REFERENCES

Habicht: C.A. 58, 3443h (1963).
Taylor et al.: C.A. 55, 6489h (1961).
Hoefle et al.: C.A. 55, 589g (1961).
Brown: "The Pyrimidines" (1962), Interscience Publishers, p. 190.

RAYMOND V. RUSH, Primary Examiner

U.S. Cl. X.R.

71—92